United States Patent [19]
Muhlbach et al.

[11] 3,809,306
[45] May 7, 1974

[54] APPARATUS FOR ROUNDING WELDED EDGE SEAMS

[75] Inventors: Anton Muhlbach, Frankfurt am Main-Sossenheim; Gerhard Lauckhardt, Frankfurt am Main-Rodelheim, both of Germany

[73] Assignee: USM Corporation, Boston, Mass.

[22] Filed: Mar. 2, 1972

[21] Appl. No.: 231,130

Related U.S. Application Data

[62] Division of Ser. No. 49,111, June 23, 1970, Pat. No. 3,673,300.

[52] U.S. Cl............... 228/5, 100/226, 228/6, 228/13, 264/160
[51] Int. Cl.............................................. B23k 1/20
[58] Field of Search........... 228/4, 5, 6, 13; 264/152, 264/160, 163, 248, 249; 219/10.53; 101/226

[56] References Cited
UNITED STATES PATENTS

| | | |
|---|---|---|
| 2,510,383 | 6/1950 | Dalgleish .................. 264/163 X |
| 3,335,892 | 8/1967 | Hildreth......................... 264/248 X |
| 3,466,214 | 9/1969 | Polk et al...................... 264/163 X |
| 3,503,827 | 3/1970 | Clamp et al. ........................ 91/36 |
| 3,518,334 | 6/1970 | Carrigan et al................ 265/163 X |
| 3,571,550 | 3/1971 | Rose et al........................ 219/10.53 |

Primary Examiner—J. Spencer Overholser
Assistant Examiner—Robert J. Craig
Attorney, Agent, or Firm—William R. Evans; Vincent A. White; Richard B. Megley

[57] ABSTRACT

An apparatus for producing rounded edges on cuts made through welded seams in layers of material by a die placed on the material in which the die is first pressed into but not through the seams while the weld is soft to roundingly deform the material adjacent the die. After solidification of the weld, further die pressure cuts the material to form a welded edge seam having rounded edges.

2 Claims, 5 Drawing Figures

APPARATUS FOR ROUNDING WELDED EDGE SEAMS

This is a Divisional application of co-pending application No. 049,111 filed June 23, 1970, in the names of Anton Muhlbach and Gerhard Lauckhardt now entitled "Method of Rounding Welded Edge Seams" now Pat. No. 3,673,300.

BACKGROUND OF THE INVENTION

This invention relates to apparatus for rounding edges on welded seams cut from layers of sheet material by cutting presses. Such presses typically have a pressure platen movable against dies placed on the material to be cut. The material is supported in spaced relation to the platen by a support plate. The dies are pressed by the platen into the material to cut through the material.

Welded seams between separate layers of weldable material are produced by heating the material where a seam is desired until it softens to weldingly combine with the other layers. The heating is then terminated and the material allowed to solidify to form a seam combining the layers. The seam is then cut by the die along the seam to form welded edge seams on the material between the layers.

Heating of many materials is conveniently accomplished with high frequency electrical energy applied to the platen. When the platen presses against an electrically conducting die on the material, the high frequency energy is transferred from the platen through the die to the material which, if high frequency active, heats at the points of contact with the die due to dielectric losses of the high frequency energy in the material. Sufficient heat is generated to form a welded seam in the material at the points of contact of the die with the material.

It is frequently necessary to prevent the layers of material from separating while the welded seam remains in a softened condition. Separation results from the resilience of the material which is compressed by the die pressure during the welding operation. Separation of the welded seam is more pronounced where a second material has been placed between the layers of welded material adjacent the weld prior to the welding operation. In the manufacture of shoes the second material may be a sponge-like sheet used to provide cushioning to the shoe part. In the general industry field the second material may be fluid which is sealed under pressure in a cavity formed between the layers of the welded material.

To prevent separation of the welded material, the die pressure dwells on the material after temination of the heating energy. The dwell pressure physically holds the seams together until the welded material sufficiently solidifies to resist separation.

After solidification of the weld during the dwell period, further pressure is applied to the die by the platen to cut the welded material with the die. The die slices the material with knife-like action. Such cuts made by the die in the solidified weld have sharp corners on the cross section of the edges of the cut.

In many products where the edges of the cut seam are exposed in the final product, sharp corners on the edges of the cut seams are undesirable. In shoes, such sharp cornered edges chafe and result in an uncomfortable shoe. In general industry applications, the sharp cornered edges are uncomfortable to handle and scrape adjacent articles with which they come in contact.

SUMMARY OF THE INVENTION

Accordingly, it is an object of the invention to round the cross section of edges on welded seams cut from layers of material while still preventing separation of the weld.

To this end, a novel method of rounding cut edges on welded seams was developed and a novel machine was provided to carry out the method. In the practice of the method, layers of material are welded together and pressure is applied to the material by a die while the weld is still soft. The pressure pushes the die part way through the soft, welded material but does not cause the die to cut through the material. The softened material roundingly deforms adjacent the die due to the plastic condition of the softened material. The welded material is then allowed to cool and solidify by terminating the heating energy used to form the weld. Die pressure sufficient to prevent separation of the seam is maintained during solidification of the welded material. Further pressure applied by the die along the deformation in the material then cuts the welded seam from the material. Rounded edges are thus formed on the cut welded seam.

An apparatus for carrying out the method has a controllable power supply for operating a platen which presses a die onto material on a support plate spaced from the platen. The power supply has controls which, at appropriate times, provide preset die pressures on the material sufficient to prevent separation of the weld prior to solidification of the weld and to cut the solidified, welded material. The power supply also has a control which provides a rounding pressure to press the die part way through the material to roundingly deform the material adjacent the die. The latter control is effective while the weld is in a softened condition.

The above and other features of the invention will be more particularly described with reference to an apparatus embodying the invention shown in the drawings and thereafter pointed out in the claims.

DESCRIPTION OF THE PREFERRED EMBODIMENT

Figure 1:
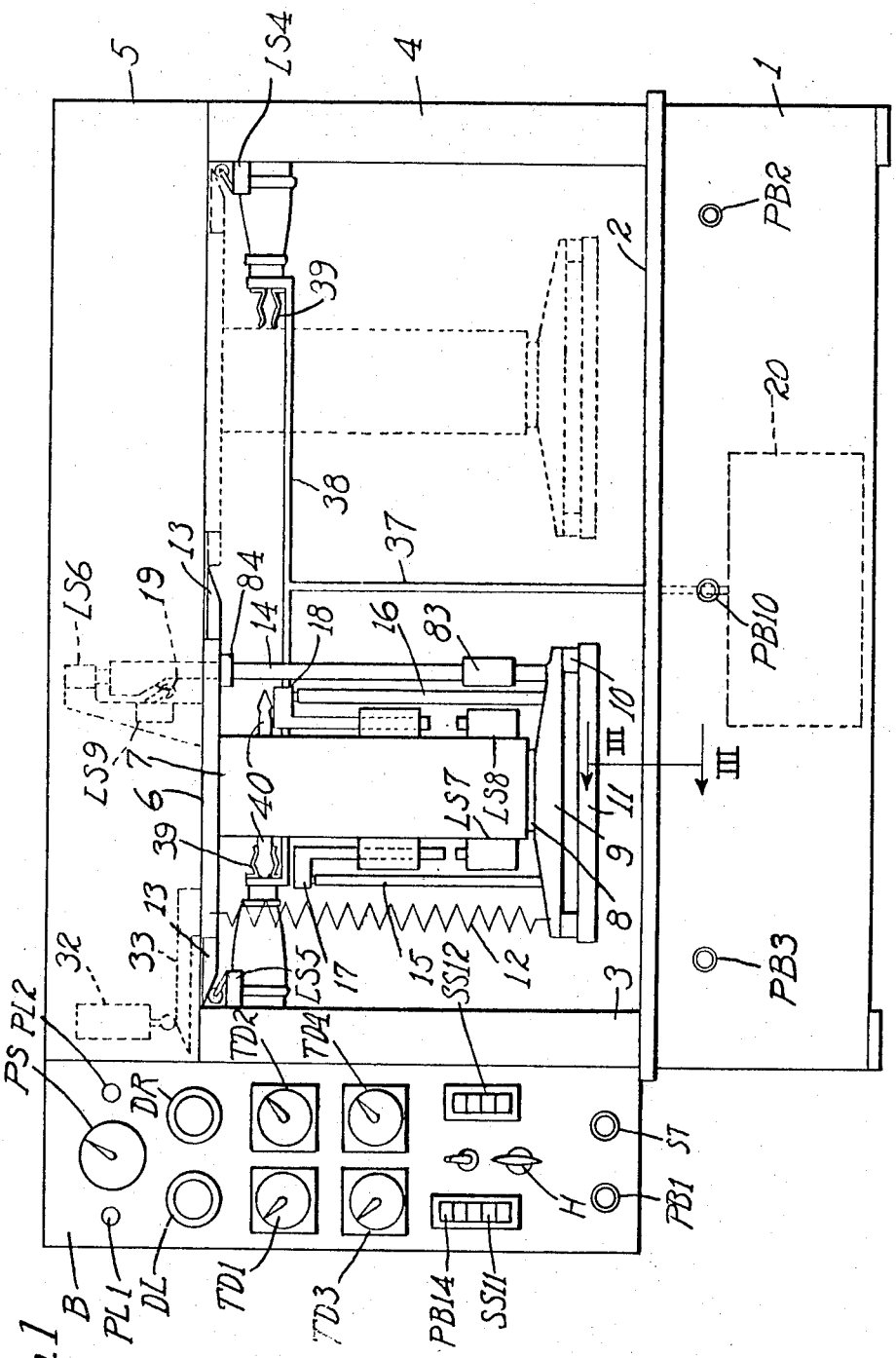
FIG. 1 is a schematic front elevation of a welding and cutting press embodying the invention.
Figure 3:
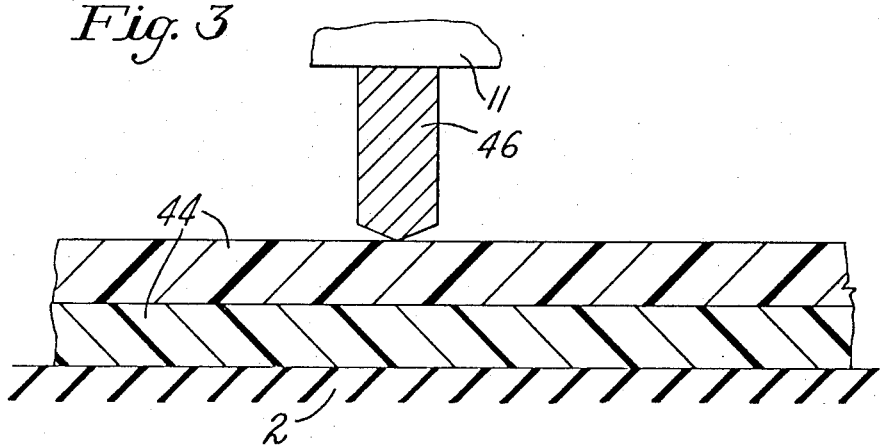
FIG. 3 is a cross-sectional view taken along line III–III in FIG. 1 of a portion of the press showing a die in position to weld material.

As shown in FIG. 1, a machine of the type described in U.S. Pat. application Ser. No. 807,786, now Pat. No. 3,571,550 filed Mar. 17, 1969 in the name of A. Muhlbach and R. Rose has a support plate 2 for receiving layers of sheet material 44 (FIG. 3) to be cut by a die 46 placed on the upper surface of the material. A pressure platen 11 is mounted for movement of approach and separation with the support plate. The platen also communicates with a high frequency generator 20 which supplies high frequency electrical welding energy to the platen.

Figure 2:
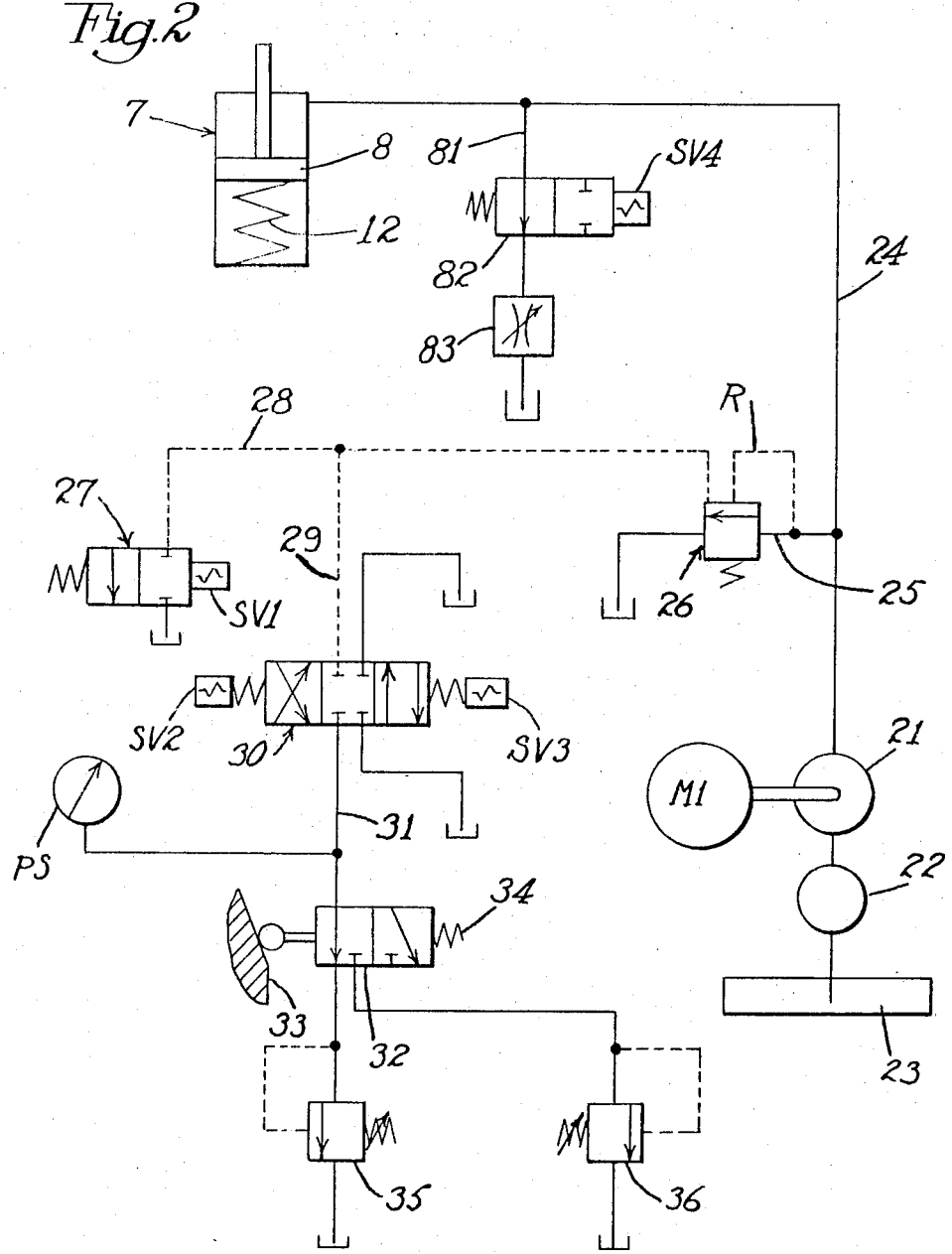
FIG. 2 is a diagram of the hydraulic control circuit for operating the press shown in FIG. 1.
Figure 4:
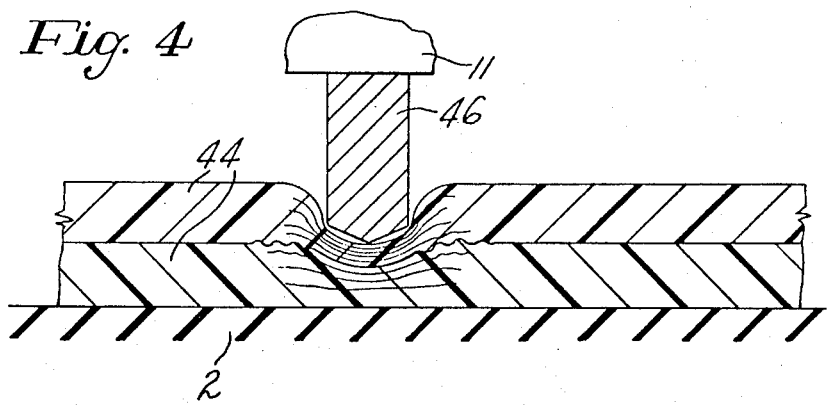
FIG. 4 is a cross-sectional view of the press shown in FIG. 3 but with the die position part way through softened material being welded.

As shown in FIG. 2, a piston 8 in cylinder 7 is effective to hydraulically lower the platen against the die with pressures controlled by valve 26 and throttle 83 connected to hydraulic pressure line 24. A welding pressure is first applied to the die on the material by the platen the corresponding die position being shown in FIG. 3. The generator is then activated by pressure switch PS on a branch 31 of the line 24 to provide welding energy to the platen and die in contact with the platen. After welding together the layers of material, the high frequency generator is cut off by electronic controls (not shown). A valve 82 then opens a line 81 to disconnect the throttle from line 24. Disconnecting the throttle causes the platen to produce a transiently increased rounding pressure on the die on the material moving the die to a dwell position shown in FIG. 4.

Figure 5:
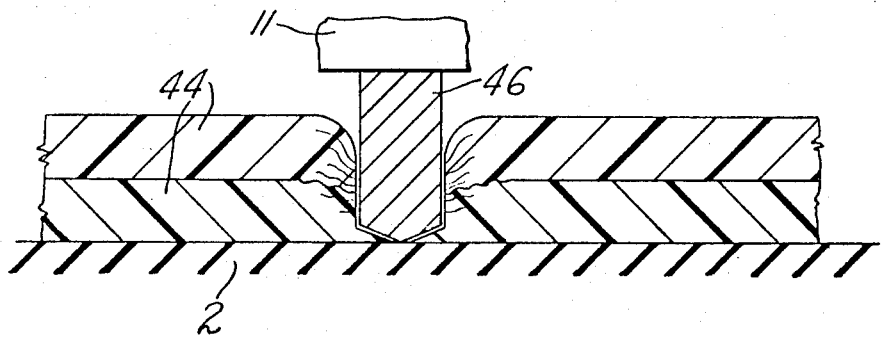
FIG. 5 is a cross-sectional view of the press portion shown in FIG. 3 but with the die having cut through solidified, welded material.

Valve 26 then self-adjusts to restore the preset welding pressure for a dwell period during which the welded material is held together by the die until, in the absence of high frequency welding energy, it solidifies. Valve 30 is then activated to cause valve 26 to produce a cutting pressure at which the platen forces the die through the material along the rounded, welded seam as seen in FIG. 5. A welded seam with an edge of rounded cross section is thus produced.

Referring again to FIG. 1, a box-shaped base 1 carries a stationary plate 2 for receiving layers of material which are to be welded together and subsequently cut along the weld. Side stands 3 and 4 extend upwardly from the base 1 and are connected at their upper ends by a beam 5. A carriage 6 can be traversed by an electric motor (not shown) in guide bearings (not shown) on the beam between a left position which is shown in solid lines in FIG 1, and a right position, indicated by phantom lines. A single-action hydraulic actuator cylinder 7 is attached to the lower side of the carriage. A downward-protruding piston 8 projects from the cylinder and supports a carrier plate 9 which carries via insulating sleeves 10 a pressure platen 11 which serves as an electrode in the welding operation. A return spring 12 connecting the carrier plate and the carriage acts to lift the pressure platen to its initial position shown in FIG. 1 after each welding and cutting operation from a position contacting the die placed on the material.

A main switch H arranged on a control panel B on the left side of the machine as well as a pump motor starting button PB1 and a pump motor stopping button ST serve for switching on the electrical controls (not shown) of the machine. In order to move the carriage 6 from one end position to the other, which movement is followed immediately by the welding-cutting operation, electrical start buttons PB2 and PB3 are provided for movement to the left and right respectively. At the end of the movement to the right switching dogs 13 actuate a limit switch LS4 and at the end of movement to the left, a limit switch LS5 for effecting the interruption of the carriage travel and initiation of the welding-cutting process.

A high frequency welding generator 20 is arranged in the lower part 1 of the machine. An insulated line 37 connects an output terminal of the generator to a distribution bus 38 having contact springs 39 at its right and left ends. Contact blades 40 insulatedly supported on either side of the actuating cylinder of the pressure platen connect with the contact springs in either the right or left position of the platen.

FIG. 2 shows the hydraulic control circuit of the welding-cutting machine. A pump 21, driven by an electric motor M1, is arranged on the beam 5 of FIG. 1 and draws pressure fluid, cleaned by filter 22, from a sump 23 and supplies it to pressure line 24 which is in constant communication with the cylinder 7. A line 25 branches off from the line 24 to an hydraulically piloted self-adjusting pressure limiting valve 26 through which the fluid may be exhausted back to the sump. A pilot line 28 is provided for controlling the pressure limiting valve 26. Pressure in the line 28 opposes opening of the valve by pressure in its relief control line R and runs to a two-position solenoid valve 27 with an actuating winding SV1. A branch line 29 of the line 28 leads to a 3-way solenoid valve 30 with two actuating windings SV2 and SV3.

In an idling condition of the machine with the platen in its initial raised position the solenoid valve 30 is moved to the right by means of the winding SV2 energized by the electrical control (not shown). Rightward movement of the valve 30 establishes a direct connection of the pilot lines 28 and 29 with the sump, whereby the pressure limiting valve 26 also opens completely because of the pressure in the line R and prevents a pressure build-up in the line 24. The piston 8 in cylinder 7 thus does not move the platen which is held in its upper idling position by the spring.

For the welding operation, which requires a relatively low contact pressure on the die on the material, the solenoid valve 30 is deflected to the left beyond the center position by means of a second electrically controlled winding SV3. In its left position valve 30 connects line 29 via an intermediate branch line 31 to a two-position switching valve 32 (see also FIG. 1), which in the left position of the carriage 6 is deflected in its right-hand position as shown in FIG. 2 by a switching cam 33 on the carriage, while in the right-hand position of the carriage 6 it assumes its left-hand position under the action of a return spring 34. Thus the line 31 is connected with the sump, depending on the position of the switching valve 32, through either a left or right pressure limiting valve 35 or 36 the opening pressures of which are adjustable independently of each other for presetting the pressure which valve 26 maintains in line 24 and thus the pressure with which the platen 11 is pressed against the die on the material during the welding operation. An indicating pressure switch PS connected to the line 24 gives an "on" pulse to activate the welding generator to weld the material at the die when the pressure in the actuating cylinder reaches a given preset welding pressure. The pressure switch PS is vented when the solenoid valve 30 is deflected to the right in a subsequent operation of the machine. A welded seam is thus formed in the layers of material.

The welded seam rounding operation requires a pressure intermediate the welding and cutting pressures sufficient to press the die part way through the softened, welded material to deform the material adjacent the die and thus round the edge to be cut. To this end, the high frequency welding energy is first terminated by an electrical control (not shown). The winding SV4 is then energized by the electrical control (not shown) to suddenly open the normally closed valve 82 in line 81 which is in parallel with the cylinder 7 on the line 24. Opening valve 82 terminates fluid flow through the throttle 83 to the sump. The sudden termination of fluid flow causes a transient pressure increase in line 24 and connected cylinder 7. The pressure control valve 26 has a finite response time to the increased pressure before it opens to self-adjust the pressure in line 24 to the pressure preset by the valves in lines 28 and 29 as described in connection with the other operations of the machine. Thus a transient pressure increase over a finite time is experienced in line 24 and connected cylinder 7 which pushes the piston 8 and platen 11 against the die with a pressure greater than that established by valve 30 then in the left, welding pressure position. Proper adjustment of the throttle 83 presets the transient pressure increase to a pressure lower than that needed to cut the material. The die is thus pushed part way through the material. The softened, welded material adjacent the die deforms under the increased pressure of the die. Rounded edges are thus formed adjacent the die.

As the valve 26 responds to the transiently increased pressure in line 24, it opens further to reduce the pressure in line 24 to the welding pressure determined by the valves in lines 28, 29, and 31 as described above. As the die pressure is reduced, the material deformed during the transient pressure increase begins to elastically return to its undeformed position. Such return is arrested by the solidification of the surface of the material due to cooling following the termination of the high frequency heating energy. Rounded edges are thus maintained adjacent the die.

The welding pressure now serves as a dwell pressure maintained by the die on the material until the weld has cooled and completely solidified. Separation of the welded seam is thus prevented.

After the completion of the welding, rounding and subsequent cooling during a definite dwell time, the actuating winding SV3 is deactivated by the electrical control (not shown) and the solenoid valve 30 assumes under spring action its center position shown in FIG. 2, in which the branch line 29 is shut off. Shutting off the line 29 closes the valve 26 and the pressure in the line 24 thus increases to the maximum pressure of the pump 21, which pressure causes the platen to press the die through the welded material at the welded, rounded seam. Edges of rounded cross section are thus obtained on the cut made in the welded seam of the material.

Renewed excitation of the actuating winding SV2 by the electrical control (not shown) then terminates the operation of the press. The solenoid valve 30 moves to the right and the lines 29 and 30 are vented again directly into the sump, and the return spring 12 then lifts the piston and platen to their initial position.

During the events described above the actuating winding SV1 of the solenoid valve 27 is excited by the electrical control (not shown) to keep the valve 27 in the open position. When all elements of the machine are switched off, the valve 27 closes under the influence of the return spring connected to the valve. Closing valve 27 vents line 28 to the sump and thereby prevents a pressure increase in the line 24 leading to the actuating cylinder 7 as an otherwise occurring consequence of the return of the valve 30 to its closed center position under spring action while the pump 21 continues to run under the inertial influence of its mass. The machine cycle is thus complete.

Although the invention has been described as applied in a welding and cutting press welding with high frequency energy and having two working positions, it will be understood that the principle of the invention is applicable to presses using other welding energy forms and having any number of working positions.

It is also understood that the welding energy may be terminated either before or after the application of the material deforming die pressure forming rounded edges in the material so long as the die may be pressed part way through the material to make a deformation in the material retainable by solidification of the material.

It is similarly understood that other variations in the method and apparatus of the invention as described may be made without departing from the scope of the invention.

Having thus described our invention, what we claim as new and desire to secure by Letters Patent of the United States is:

1. Apparatus for rounding edges on cuts made in welded seams between layers of material, which comprises:
   a die engaging the material;
   means for welding together layers of the material at the die to form seams between the layers;
   a controllable power supply;
   means connected to and responsive to the power supply for pressing the die into the material;
   means controlling the power supplied to the pressing means for pressing the die into but not through the material while welding the material;
   means controlling the power supplied to the pressing means for further pressing the die into but only part way through the material after welding to roundingly deform the weld-softened material adjacent the die; and
   means operative after all the preceding means and after the weld has solidified and controlling the power supplied to the pressing means for pressing the die through the material along the solidified, welded seams to cut the material with the die whereby the rounded deformation forms rounded edges on a cross section of the cut.

2. Apparatus as in claim 1 wherein the controllable power supply comprises a hydraulic pressure line; a throttle and valve connected to the line for producing pressure variations in the line and a preset self-adjusting pressure control valve in the line, the control valve having a finite response time to the variations in line pressure for transiently maintaining the pressure variations.

* * * * *